Dec. 25, 1956 K. SCHÜTZ 2,775,482
MEANS FOR DISTRIBUTING LIQUIDS VERY FINELY
Filed Nov. 22, 1952
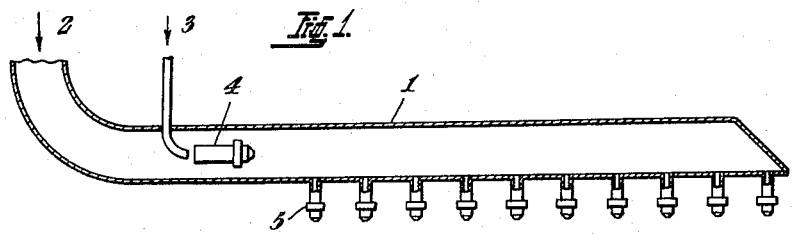
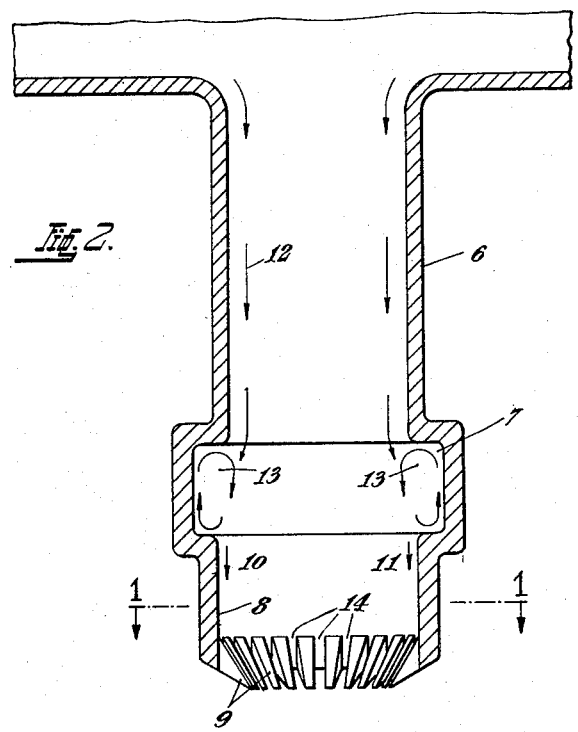
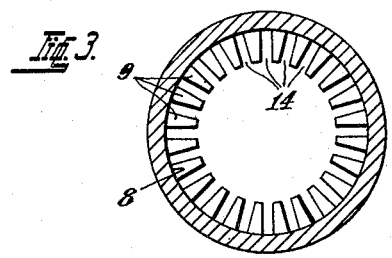
KURT SCHÜTZ
INVENTOR

United States Patent Office 2,775,482
Patented Dec. 25, 1956

2,775,482

MEANS FOR DISTRIBUTING LIQUIDS VERY FINELY

Kurt Schütz, Vevey, Switzerland, assignor to Berthoud & Cie, Vevey-Corseaux, Switzerland, a corporation of Switzerland Application November 22, 1952, Serial No. 321,974

5 Claims. (Cl. 299—86)

This invention relates to means for distributing liquids very finely. The object of the invention is to enable liquids to be distributed very finely without the assistance of atomiser nozzles.

According to the invention, distributing liquids very finely by means of a distributor tube and discharge tubes arranged at an angle to the latter, is characterised in that air and liquid in atomised form are blown longitudinally under positive pressure through the distributor tube into the discharge tubes where the liquid is distributed as a film on the inside wall of the discharge opening under the influence of the flow velocity of the air in a section of the discharge tube of different cross section, and that this film is broken up into very fine particles at the edge of the opening and flows away with the air. In this operation, the atomised liquid is deposited in uniformly divided form over the length of the distributor tube and on the inside wall thereof and flows into the discharge tubes of the distributor tube. Due to the contact with the internal wall of the distributor tube, the droplets are again united into a film of liquid or into trickles, drops or waves and pass in this form into the discharge tubes.

A further development of this invention has led to a constructional form in which the liquid entering the discharge tube is reliably conducted to the edges of the outlet opening as a uniformly divided film of liquid and in which this liquid film can be blown out as very fine droplets at the edges of the outlet openings of the discharge tube.

The invention therefore further comprises means for distributing liquids very finely comprising a distributor tube and discharge tubes arranged at an angle to the latter and means for supplying air and liquid in atomised form under positive pressure to the distributor tube, the discharge tubes having an enlarged cross section concentric with the discharge tube axis between the discharge opening and the distributor tube for the purpose of forming a film on the inside wall of the tube, and the edge of the opening having teeth which project into the opening for the very fine division of the liquid.

If the liquid is conveyed under the action of the air stream along the inside of the discharge openings, which are arranged in the form of cylindrical tubes, and before reaching the edges of the opening is conducted through a sudden annular enlargement of the cylindrical tube, a liquid film is formed owing to the changed pressure conditions, which effects a uniform division of the liquid on the edges of the opening. According to a further development of the invention, the uniform liquid film issuing from the annular enlargement is moved over radially extending teeth which are arranged on the edges of the opening, and the liquid is advanced up to the tips of the teeth along the flanks thereof, which are inclined towards the center of air stream, in order to be detached therefrom as liquid droplets and to be carried along by the stream of air. In order to carry this process into effect, the teeth arranged on the edge of the opening are of such a shape and are so arranged that their height at the wall of the opening, measured in the direction of the tube axis, is greater than the tooth width measured in the direction of the tube circumference, and that their toothed flanks disposed opposite to the direction of flow, are directed towards points of the tube axis which are disposed externally of the tube.

As a result of the sudden annular enlargement of the outlet openings with a following constriction thereof to substantially their original dimensions, there is reliably achieved the effect that (in the case where the liquid is moved forward in the discharge openings in the form of trickles) the liquid is detached by the change in pressure conditions on flowing through the annular enlargement and a liquid film is formed which is uniformly distributed over the whole of the edge of the outlet opening. This film can then be broken down into extremely fine droplets or, in accordance with the present invention, can be detached in the form of fine droplets of liquid from the tips of the teeth arranged radially at the edges of the opening. This form of extremely fine atomisation is particularly advantageous because there are no moving parts and consequently there can be no wear on the outlet openings. The discharge openings are circular and provide an enlarged free passage to the air. By this means the frictional losses are reduced, so that the emission energy is substantially increased, this being particularly advantageous, for example, when it is a question of penetrating a plant crop when combatting animal and fungoidal pests.

In order that the invention may be clearly understood, one embodiment thereof will now be described by way of example with reference to the accompanying diagrammatic drawing, in which:

Figure 1 is a longitudinal section through a distributor tube and its discharge tubes, Figure 2 is a longitudinal section through a discharge tube to a larger scale, and Figure 3 is a cross-section on the line III—III of Figure 2.

In Figure 1, 1 represents the elongated distributor tube, into which compressed air is introduced at 2 and the liquid at 3 through a bent pipe. An atomiser device 4 effects the atomisation of the liquid being supplied for the purpose of the lengthwise distribution thereof by the air-stream in the elongated distributor pipe 1. A number of discharge tubes 5 are arranged adjacent one another and at an angle to the distributor tube.

As shown in Figure 2, each discharge tube 5 consists of a cylindrical delivery tube 6 with a sudden enlargement in the form of an annular chamber 7 and a cylindrical discharge opening 8 which is constricted again, the edge of said opening having provided thereon radially arranged teeth 9, which are shown in plan view in Figure 3.

The effect which it is desired to achieve is to supply the liquid to the outlet opening 8 as a uniform film, that is to say, the film should have an equal thickness at the places marked 10 and 11. If the liquid in the discharge tube 6 has not formed a uniform film but reaches the outlet opening as a trickle 12 without being distributed on the internal wall, the annular chamber 7 effects a uniform distribution of the liquid on the circumference by the sudden enlargement of the tube cross section. The air flowing at high velocity through the tube 6 undergoes a sudden reduction in pressure in the sudden enlargement formed by the chamber which reduction effects the breaking-up and distribution of the liquid. Following the pressure drop, the liquid, for example in the form of the trickle 12, flows into the annular chamber and fills this completely. The "ring of liquid" formed in this manner is given an eddying motion in the direction of the arrows 13 under the action of the air flowing past. Since liquid continues to flow, the stream of air carries with it the same quantity of liquid from the inside diameter of the liquid ring and thus produces at 10 and 11 in the discharge tube 8 the liquid film which is distributed uniformly on the circumference.

The liquid film which is uniformly broken up and distributed in this manner is then led to the rim of the opening by the air stream, converted into extremely fine droplets and carried along by the air stream.

If this conversion of the liquid film is to be carried out by means of the radial teeth according to the invention, a uniform distribution of the liquid film as at 10 and 11 is not absolutely necessary. The atomisation at the outlet then takes place in the following manner. The air, which is flowing to atmosphere at a high velocity also through the slots 14 between the teeth 9, produces an eddy on the flank surfaces of the teeth and consequently a zone of reduced pressure. Under the action of the stream of air, the liquid also passes through between the teeth and, following the pressure drop, flows into the zones of reduced pressure on the flanks of the teeth. Since the radially extending tooth flanks are slightly inclined in the direction of the stream of air, the liquid travels to the tips of the teeth. The detachment of the liquid in extremely fine droplets now occurs on the tips of all teeth, because the point of detachment is acted upon on all sides by the stream of air. An air pressure of 200 to 300 mm. water column is adequate for carrying operation into effect.

It is essential for the purpose of the apparatus that the teeth 9 on the rim of the opening are radially disposed and outwardly inclined, and that their height at the wall of the opening, measured in the direction of the tube axis is greater than the tooth width measured in the direction of the circumference of the tube, and that the radially disposed flanks of the teeth 9 are directed towards points of the tube axis which are outside the tube. The apparatus according to the invention for the distribution of liquids by at least one sudden annular enlargement and teeth arranged radially on the edges of the opening can be used for the breaking up and atomisation of any liquids, for example the atomisation of liquid in oil burners or the like.

What I claim is:

1. Means for distributing liquids very finely comprising a distributor tube and discharge tubes having discharge openings arranged at an angle attached to the latter and means for supplying air and liquid in atomised form under positive pressure to the distributor tube and to the discharge tubes, each of the discharge tubes having an enlarged cross section concentric with its axis and located between the discharge opening and the distributor tube for the purpose of forming a film on the inside wall of the tube, and the edge of the opening having teeth which project into the opening for the very fine division of the liquid.

2. Means according to claim 1, wherein the inner and outer surfaces of the teeth on the edges of the openings of the discharge tubes lie on cones with different apex angles and the teeth project outwardly beyond the plane of the edge of the opening.

3. Means according to claim 1, characterised in that the height of the teeth at the wall of the opening is greater than the width thereof.

4. A spraying device comprising a distributor tube closed at one end, a series of closely spaced nozzles aligned in an axial direction along said tube, means to feed with compressed air the open end of said tube and means to atomize liquid into said air at a point upstream with respect to all of said nozzles, whereby the liquid atomized in said compressed air is deposited throughout the length of said tube on the inner wall thereof in a thin liquid formation which is fed into said nozzles, the latter being provided with terminal edges adapted to break up at least part of the liquid formations thus fed thereto into a succession of formations of fine droplets corresponding to a substantially uniform rate of delivery from each nozzle and the cross-sectional area of each nozzle being greatly in excess of the corresponding area of the liquid formation passing through said nozzle, whereby the stream of air is divided into jets of substantial cross-section by passing through said nozzles, each such jet successively entraining said formations of droplets, while giving the same a considerable kinetic energy, the outlet of each one of said nozzles being provided with an annular row of teeth extending radially inward and downstream, whereby the formations of liquid fed to said outlet flow along said teeth, while being split up into droplets, and whereby the droplets thus fed to the points of said teeth are embedded in said air jet and thus imparted with a considerable kinetic energy, and each one of said nozzles being provided, upstream said row of teeth, with an annular eddy chamber whereby substantially uniform distribution of the liquid formations fed into said nozzle is effected.

5. A spraying device according to claim 4, in which said eddy chamber is constituted by an integral portion of enlarged diameter of said nozzle.

References Cited in the file of this patent

UNITED STATES PATENTS

| | | |
|---|---|---|
| 394,921 | Hallowell | Dec. 18, 1888 |
| 1,441,425 | Jackson | Jan. 9, 1923 |
| 1,462,395 | Thomson | July 17, 1923 |
| 2,029,337 | Parker | Feb. 4, 1936 |
| 2,285,831 | Pennypacker | June 9, 1942 |

FOREIGN PATENTS

| | | |
|---|---|---|
| 602,404 | France | Mar. 18, 1926 |